US007185190B2

(12) United States Patent
Rothman et al.

(10) Patent No.: US 7,185,190 B2
(45) Date of Patent: Feb. 27, 2007

(54) PUSHING CAPABILITIES INTO FIRMWARE BY AN OPERATING SYSTEM

(75) Inventors: Michael A. Rothman, Puyallup, WA (US); Vincent J. Zimmer, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 472 days.

(21) Appl. No.: 10/748,458

(22) Filed: Dec. 29, 2003

(65) Prior Publication Data

US 2005/0149713 A1 Jul. 7, 2005

(51) Int. Cl.
*G06F 15/177* (2006.01)
*G06F 9/24* (2006.01)

(52) U.S. Cl. ............................ 713/2; 713/1; 711/113; 710/8

(58) Field of Classification Search .................... 713/1, 713/2; 711/113; 710/8
See application file for complete search history.

(56) References Cited

U.S. PATENT DOCUMENTS 6,934,809 B2 * 8/2005 Tremblay et al. ........... 711/137
6,993,645 B2 * 1/2006 Joseph et al. .................. 713/2
7,000,077 B2 * 2/2006 Grimsrud et al. ........... 711/137
2004/0181656 A1 * 9/2004 Stern et al. .................... 713/1
2004/0236934 A1 * 11/2004 Zimmer et al. ................ 713/1
2005/0071617 A1 * 3/2005 Zimmer et al. ................ 713/1

* cited by examiner

*Primary Examiner*—A. Elamin
(74) *Attorney, Agent, or Firm*—Blakely, Sokoloff, Taylor & Zafman LLP

(57) ABSTRACT

A method and system to push capabilities into firmware by an operating system. A pre-boot driver is accessed at a computer system during operating system runtime of the computer system. The pre-boot driver is deposited in a repository available to firmware of the computer system. The pre-boot driver is found at the repository by the firmware during a subsequent pre-boot phase of the computer system. The pre-boot driver is executed during the subsequent pre-boot phase. In one embodiment, the computer system includes firmware that operates in accordance with the Extensible Firmware Interface (EFI) framework standard.

26 Claims, 5 Drawing Sheets

COMPUTER SYSTEM RESET AND IN PRE-BOOT PHASE

100

PUSHING CAPABILITIES INTO FIRMWARE BY AN OPERATING SYSTEM

BACKGROUND

1. Field of Invention

The field of invention relates generally to computer systems and, more specifically but not exclusively, relates to pushing capabilities into firmware by an operating system of a computer system.

2. Background Information

In a typical PC architecture, the initialization and configuration of the computer system by the Basic Input/Output System (BIOS) is commonly referred to as the pre-boot phase. The pre-boot phase is generally defined as the firmware that runs between the processor reset and the first instruction of the Operating System (OS) loader. At the start of a pre-boot, it is up to the code in the firmware to initialize the system to the point that an operating system loaded off of media, such as a hard disk, can take over. The start of the OS load begins the period commonly referred to as OS runtime. During OS runtime, the firmware acts as an interface between software and hardware components of a computer system. As computer systems have become more sophisticated, the operational environment between the application and OS levels and the hardware level is generally referred to as the firmware or the firmware environment.

Hardware devices, such as expansion boards, often come with a pre-boot driver stored on the device in a non-volatile storage. For example, a video card may be shipped with EFI (Extensible Firmware Interface) Byte Code stored in a flash memory device on the video card. The computer system is able to read the pre-boot driver during the pre-boot phase and execute the driver. A pre-boot driver provides functionality to a hardware device during the pre-boot phase.

However, there are limitations on the amount of non-volatile memory a hardware device may have on-board. Thus, the level of functionality from pre-boot driver may be limited. Also, updating a pre-boot driver for a hardware device may require re-flashing or replacing the non-volatile storage. Such procedures can be burdensome for a user. Further, a hardware device may be installed in a computer system where the device was shipped without pre-boot drivers. Currently, a user has no way to add pre-boot functionality through pre-boot drivers to such a device.

BRIEF DESCRIPTION OF THE DRAWINGS

The present invention is illustrated by way of example and not limitation in the accompanying figures.

DETAILED DESCRIPTION

Embodiments of a method and system to push capabilities into firmware by an operating system are described herein. In the following description, numerous specific details are set forth, such as embodiments pertaining to the Extensible Firmware Interface (EFI) framework standard, to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In one embodiment of the present invention, firmware of a computer system operates in accordance with an extensible firmware framework known as the Extensible Firmware Interface (EFI) (EFI Specification, Version 1.10, Dec. 1, 2002, may be found at http://developer.intel.com/technology/efi.) EFI is a public industry specification that describes an abstract programmatic interface between platform firmware and shrink-wrap operating systems or other custom application environments. The EFI framework standard includes provisions for extending BIOS functionality beyond that provided by the BIOS code stored in a platform's BIOS device (e.g., flash memory.) More particularly, EFI enables firmware, in the form of firmware modules and drivers, to be loaded from a variety of different resources, including primary and secondary flash devices, option ROMs (Read-Only Memory), various persistent storage devices (e.g., hard disks, CD-ROM (Compact Disk-Read Only Memory), etc.), and from one or more computer systems over a computer network.

Figure 1A:
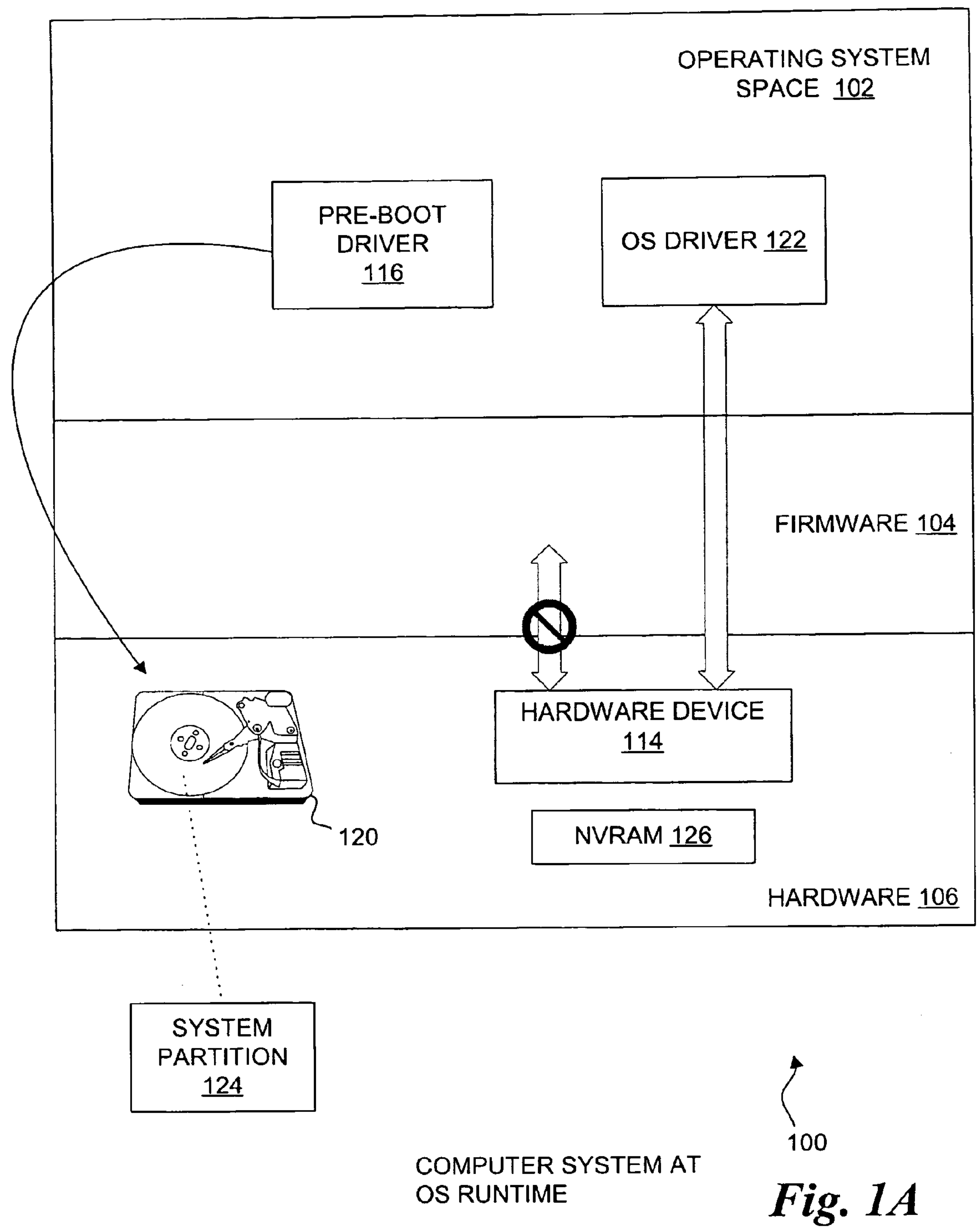
FIG. 1A is a schematic diagram illustrating one embodiment of pushing capabilities into firmware by an operating system of a computer system in accordance with the teachings of the present invention.
Figure 1B:
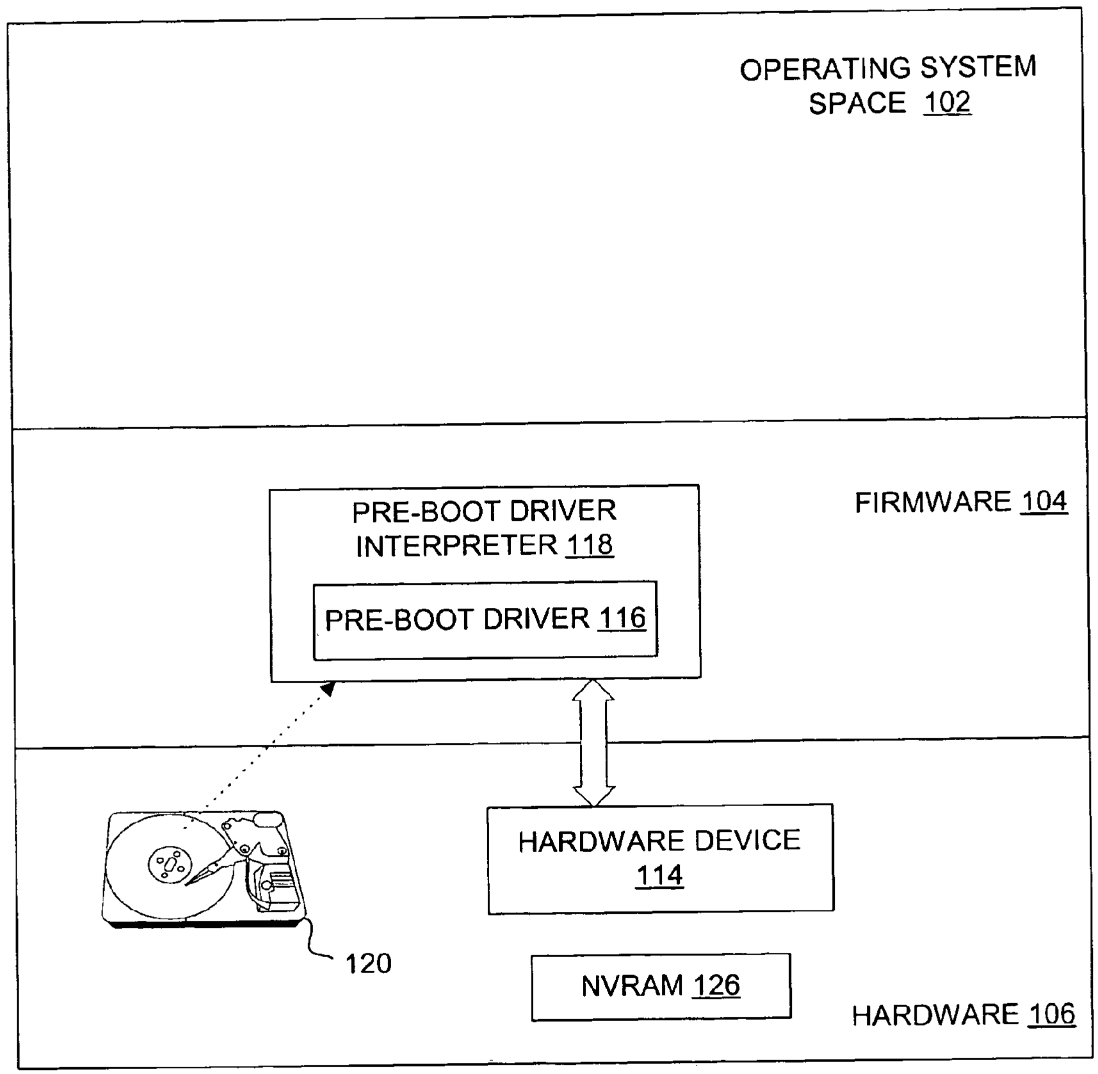
FIG. 1B is a schematic diagram illustrating one embodiment of pushing capabilities into firmware by an operating system of a computer system in accordance with the teachings of the present invention.

FIGS. 1A and 1B illustrate an embodiment of the invention to push capabilities into firmware by an operating system of a computer system 100. In short, FIG. 1A shows computer system 100 at OS runtime. A pre-boot driver for a hardware device is placed in a repository available to the OS and the firmware. Then, the computer system 100 is reset. In FIG. 1B, the computer system 100 has been reset and is in the pre-boot phase. The firmware finds the pre-boot driver in the repository and may use the pre-boot driver to access the hardware device during pre-boot.

Computer system 100 includes an operating system space 102 layered on firmware 104. Firmware 104 is layered on hardware 106 of the computer system 100. In one embodiment, the operating system space 102 includes a kernel mode space and a user mode space. In one embodiment, the firmware 104 operates in accordance with the EFI framework standard.

The hardware 106 includes a hardware device 114. Hardware device 114 includes, but is not limited to, a processor, a chipset, a memory module, an Input/Output (I/O) device, or the like. An I/O device includes a disk controller, a RAID (Redundant Array of Inexpensive Disks) controller, a network interface card (NIC), a modem, or the like. In one embodiment, the hardware device 114 includes an expansion board (also known as an add-in card). Only one hardware device 114 is shown in FIG. 1 for clarity, but it will be understood that embodiments of the present invention may operate with more than one hardware device on the same computer system. In one embodiment, the hardware 106 also includes a hard disk 120 (discussed further below.)

OS space 102 includes a pre-boot driver 116. The pre-boot driver is a program that contains knowledge of the hardware device 114 to enable interaction with the hardware device by the computer system 100. The pre-boot driver is normally executed during the pre-boot phase. In one embodiment, the pre-boot driver includes interpreted code. In another embodiment, the pre-boot driver operates in accordance with the EFI framework standard. In yet another embodiment, the pre-boot driver includes an image according to the IEEE (Institute of Electrical and Electronics Engineers) Standard 1275-1994 (IEEE Standard for Boot Firmware).

In one embodiment, the pre-boot driver includes an EFI Byte Code (EBC) driver. An EBC image can be executed by computer systems that implement EFI. An EBC driver is machine-independent and OS-independent. The EBC image may be executed on multiple platforms and architectures including both the Itanium®-based and IA-32 (Intel Architecture 32-bit processor) architectures. Since a single EBC image may be executed on multiple platforms, a reduction in code size is realized. Also, hardware device manufacturers may more efficiently serve many markets. Only a single binary is needed versus having to incur additional costs to provide multiple binaries for multiple architectures.

The OS layer 102 may communicate with the hardware device 114 using an OS driver 122 during OS runtime. However, in FIG. 1A, the firmware 104 has no pre-boot driver to access the hardware device 114 during the pre-boot phase. Embodiments of the present invention enable the OS to provide a pre-boot driver to the firmware.

During OS runtime, the OS deposits a pre-boot driver in a repository common to the OS and the firmware. In the embodiment of FIG. 1A, the OS stores a copy of the pre-boot driver 116 to a system partition 124 of hard disk 120. The system partition 124 is known to the firmware and may be read by the firmware during the pre-boot phase. Generally, the system partition refers to the disk volume that contains files that are accessible by firmware and an operating system such as, but not limited to, platform diagnostic applications, OS loaders, OS utilities, or the like (for example, in Microsoft Windows®, the system partition may include NTLdr.)

The operating system also sets a pointer that is accessible by the OS and the firmware to tell the firmware that a pre-boot driver has been saved to the repository. In one embodiment of EFI-compliant system, the pointer is saved as a variable in NVRAM (Non-Volatile Random Access Memory) 126.

Referring now to FIG. 1B, the computer system 100 has been reset and is in the pre-boot phase. During the pre-boot phase, the firmware 104 checks the pointer to determine if any pre-boot drivers have been pushed to the firmware. The pointer indicates that pre-boot driver 116 is stored in the repository. The firmware 104 launches the pre-boot driver and may use the pre-boot driver to access the hardware device 114. In the embodiment of FIG. 1B, a pre-boot interpreter 118 is launched. The pre-boot driver 116 is executed through the pre-boot interpreter 118.

Figure 2:
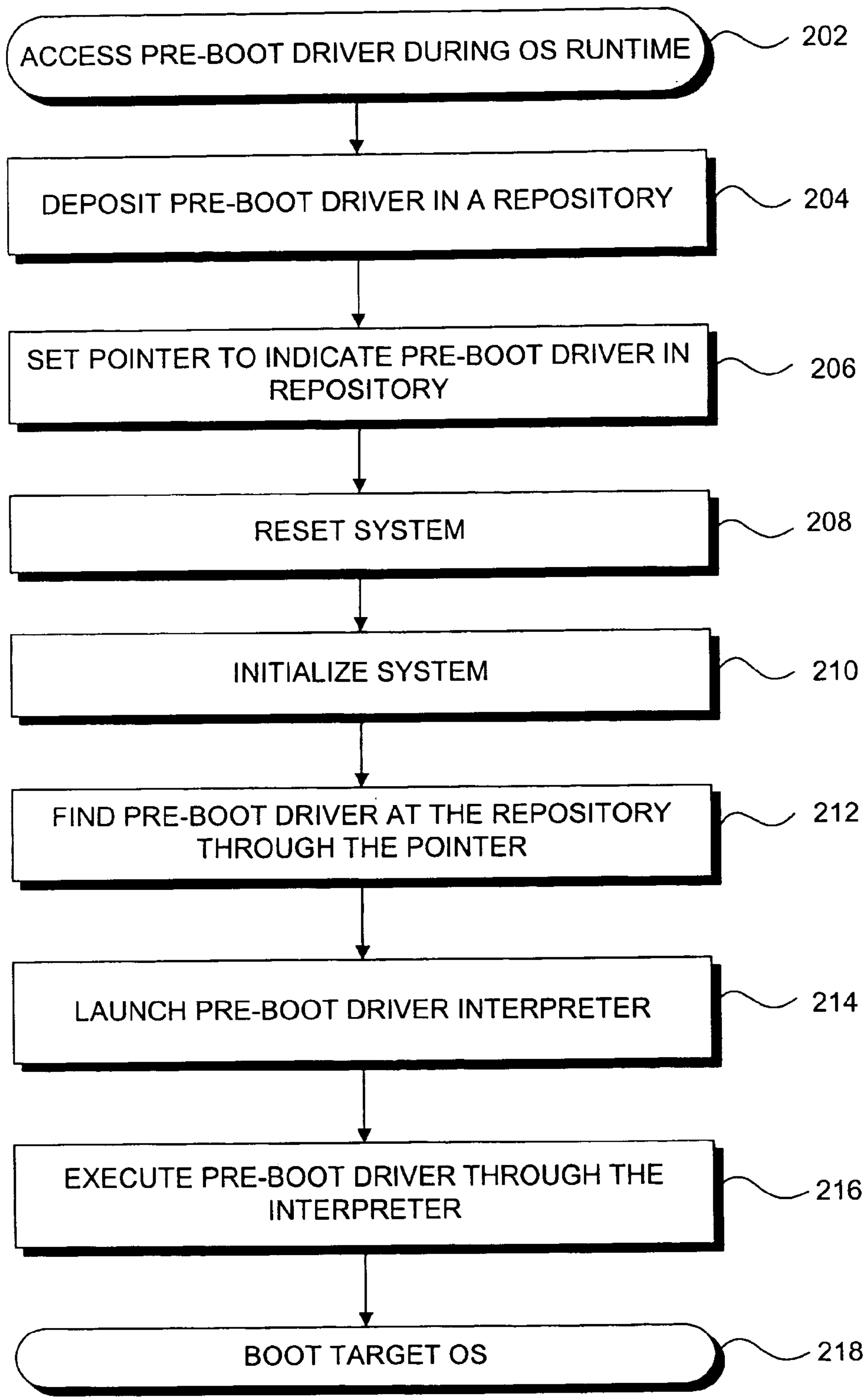
FIG. 2 is a flowchart illustrating one embodiment of the logic and operations to push capabilities into firmware by an operating system of a computer system in accordance with the teachings of the present invention.

Referring to FIG. 2, a flowchart 200 illustrates an embodiment of the present invention to push capabilities to firmware by an operating system. Beginning in a block 202, a pre-boot driver is accessed during OS runtime. In one embodiment, the pre-boot driver is provided to the OS from a storage device such as an optical disk. In another embodiment, the pre-boot driver is downloaded to the computer system from a network, such as the Internet. Continuing in a block 204, the OS deposits the pre-boot driver in a repository. The repository is accessible to the OS as well as the firmware.

In one embodiment, the repository is a non-volatile storage device. Such a non-volatile storage device includes, but is not limited, to a system partition on a hard disk, a network location, an optical disk, a floppy disk, or the like.

The logic then proceeds to a block 206 to set a pointer to indicate to the firmware that at least one pre-boot driver is stored at the repository. In one embodiment of an EFI-compliant system, setting the pointer includes setting variables to indicate the location of the pre-boot driver. Variables are defined as key/value pairs that consist of identifying information plus attributes (the key) and arbitrary data (the value.) Variable services under EFI include SetVariable to set the value of a variable and GetVariable to return the value of a variable. In one embodiment, the variables are stored in NVRAM of the computer system.

Continuing in a block 208, the computer system is reset. In one embodiment, the reset is a warm reset; in another embodiment, the reset is a hard reset. In the instance of a warm reset, the contents of the memory are not necessarily wiped clean. In one embodiment of a warm reset, the pre-boot driver may have been deposited in a hand-off block of memory. This hand-off block would contain a signature to serve as the pointer that can be found by the firmware at a pre-determined position in memory. For example, the signature may be placed on a 16K boundary of memory. Once the firmware finds the signature, the pre-boot driver would be positioned in memory following the signature.

In response to the reset event, pre-boot initialization of the computer system will begin, as depicted in a block 210. Boot instructions stored in the computer system firmware are loaded and executed. In one embodiment, the system boot instructions will begin initializing the platform by conducting a Power-On Self-Test (POST) routine.

The hardware devices of the computer system are initialized during the pre-boot phase. During the pre-boot phase, hardware devices such as a processor, the chipset, and memory of the computer system are initialized. The firmware also initializes expansion boards populating the ISA (Industry Standard Architecture), PCI (Peripheral Component Interface), AGP (Accelerated Graphics Port) or other expansion slots of the computer system. The firmware of the computer system examines each hardware device to determine if the hardware devices have stored any pre-boot drivers.

The logic proceeds to a block 212 to find the pre-boot driver at the repository through the pointer. In an EFI-compliant system, the firmware may check variables that point to a pre-boot driver. Continuing in a block 214, the firmware launches a pre-boot driver interpreter. The interpreter is used to execute pre-boot drivers during the pre-boot phase. Continuing to a block 216, the pre-boot driver from the repository is executed through the pre-boot driver interpreter. The pre-boot driver provides functionality to its corresponding hardware device during the pre-boot phase. At the completion of the pre-boot phase, the target OS is booted, as depicted in a block 218.

Embodiments of the present invention may be employed in various scenarios. For example, an EFI-compliant system may be without legacy support of a legacy expansion card. The system cannot exploit the capabilities of the expansion card. A user may receive an EBC driver for the expansion card from the card vendor. With the EBC image, the user may use embodiments of the present invention to use the expansion card during the pre-boot phase.

In another example, a device may have flawed EBC code or the EBC code may be on a non-volatile storage device, such as flash memory, that has failed. By using embodiments of the present invention, a new pre-boot driver may be pushed to the firmware from the OS. Thus, the user can maintain functionality of the device during pre-boot. Embodiments may also be used to add pre-boot functionality to the device.

Figure 3:
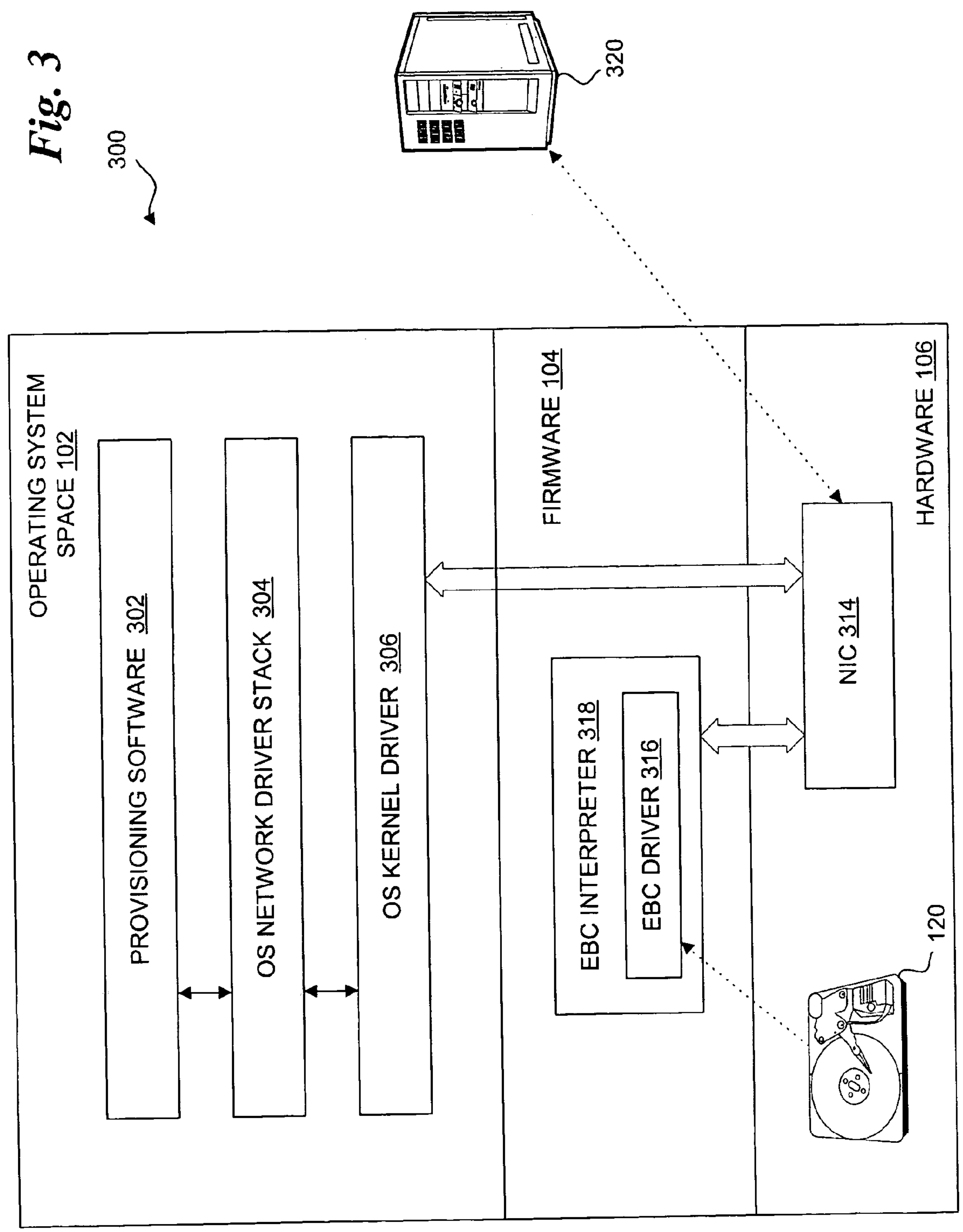
FIG. 3 is a schematic diagram illustrating one embodiment of pushing capabilities into firmware by an operating system of a computer system in accordance with the teachings of the present invention.

Referring to FIG. 3, an embodiment of the present invention to push capabilities to the firmware by the operating system of computer system 300 is shown. As described below, an EBC driver will be pushed to the firmware to provide the firmware with the capability to communicate with provisioning server 320 during the pre-boot phase.

Computer system 300 includes operating system space 102, firmware 104, and hardware 106. Hardware 106 includes hard disk 120 in which an EBC driver 316 for a NIC 314 has been deposited. The firmware 104 includes an EBC Interpreter 318 for executing the EBC driver 316.

In the embodiment of FIG. 3, a remote administrator at computer system 300 is connected to provisioning server 320. During OS runtime, the operating system space 102 includes provisioning software 302, an OS network driver stack 304, and an OS kernel driver 306 to support provisioning using the NIC 314. Normally, provisioning can only be achieved through the operating system at OS runtime. The NIC 314 may not have network stack functionality for communicating with provisioning server 320 during pre-boot.

The administrator can use embodiments of the present invention to push a network pre-boot driver to the firmware. The pre-boot driver may provide functionality such as a full network stack and more robust capabilities that would otherwise not be contained natively within the platform firmware. Software to support a provisioning agent may be used during pre-boot even though the platform firmware contained a limited pre-boot driver. Such a network pre-boot driver may support UNDI (Universal Network Device Interface), TCP/IP (Transmission Control Protocol/Internet Protocol), or the like. Thus, the network stack can be used and associated provisioning software may be utilized during pre-boot.

Figure 4:
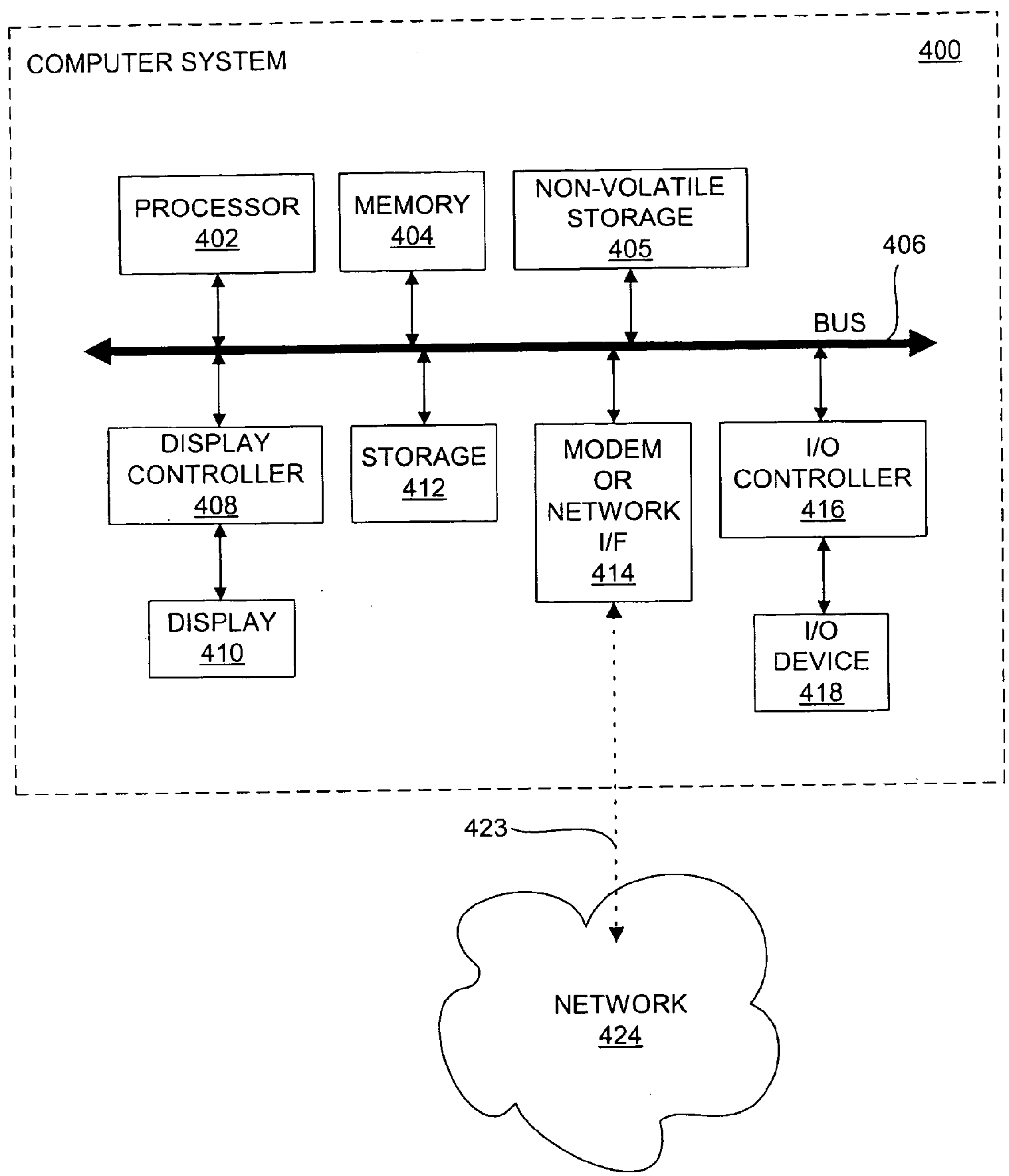
FIG. 4 is a schematic diagram illustrating one embodiment of a computer system in accordance with the teachings of the present invention.

FIG. 4 is an illustration of one embodiment of an example computer system 400 on which embodiments of the present invention may be implemented. Computer system 400 includes a processor 402 coupled to a bus 406. Memory 404, storage 412, non-volatile storage 405, display controller 408, input/output controller 416 and modem or network interface 414 are also coupled to bus 406. The computer system 400 interfaces to external systems through the modem or network interface 414. This interface 414 may be an analog modem, Integrated Services Digital Network (ISDN) modem, cable modem, Digital Subscriber Line (DSL) modem, a T-1 line interface, a T-3 line interface, token ring interface, satellite transmission interface, or other interfaces for coupling a computer system to other computer systems. A carrier wave signal 423 is received/transmitted by modem or network interface 414 to communicate with computer system 400. In the embodiment illustrated in FIG. 4, carrier wave signal 423 is used to interface computer system 400 with a computer network 424, such as a local area network (LAN), wide area network (WAN), or the Internet. In one embodiment, computer network 424 is further coupled to a remote computer (not shown), such that computer system 400 and the remote computer can communicate.

Processor 402 may be a conventional microprocessor including, but not limited to, an Intel Corporation x86, Pentium®, or Itanium® family microprocessor, a Motorola family microprocessor, or the like. Memory 404 may include, but is not limited to, Dynamic Random Access Memory (DRAM), Static Random Access Memory (SRAM), Synchronized Dynamic Random Access Memory (SDRAM), Rambus Dynamic Random Access Memory (RDRAM), or the like. Display controller 408 controls in a conventional manner a display 410, which in one embodiment may be a cathode ray tube (CRT), a liquid crystal display (LCD), an active matrix display, or the like. An input/output device 418 coupled to input/output controller 416 may be a keyboard, disk drive, printer, scanner and other input and output devices, including a mouse, trackball, trackpad, joystick, or other pointing device.

The computer system 400 also includes non-volatile storage 405 on which firmware and/or data may be stored. Non-volatile storage devices include, but are not limited to, Read-Only Memory (ROM), Flash memory, Erasable Programmable Read Only Memory (EPROM), Electronically Erasable Programmable Read Only Memory (EEPROM), or the like.

Storage 412 in one embodiment may be a magnetic hard disk, an optical disk, or another form of storage for large amounts of data. Some data may be written by a direct memory access process into memory 404 during execution of software in computer system 400. It is appreciated that software may reside in storage 412, memory 404, non-volatile storage 405 or may be transmitted or received via modem or network interface 414.

For the purposes of the specification, a machine-readable medium includes any mechanism that provides (i.e., stores and/or transmits) information in a form readable or accessible by a machine (e.g., a computer, network device, personal digital assistant, manufacturing tool, any device with a set of one or more processors, etc.). For example, a machine-readable medium includes, but is not limited to, recordable/non-recordable media (e.g., a read only memory (ROM), a random access memory (RAM), a magnetic disk storage media, an optical storage media, a flash memory device, etc.).

It will be appreciated that computer system 400 is one example of many possible computer systems that have different architectures. For example, computer systems that utilize the Microsoft Windows® operating system in combination with Intel microprocessors often have multiple buses, one of which may be considered a peripheral bus. Workstation computers may also be considered as computer systems that may be used with the present invention. Workstation computers may not include a hard disk or other mass storage, and the executable programs are loaded from a corded or wireless network connection into memory 404 for execution by processor 402. In addition, handheld or palmtop computers, which are sometimes referred to as personal digital assistants (PDAs), may also be considered as computer systems that may be used with the present invention. As with workstation computers, handheld computers may not include a hard disk or other mass storage, and the executable programs are loaded from a corded or wireless network connection into memory 404 for execution by processor 402. A typical computer system will usually include at least a processor 402, memory 404, and a bus 406 coupling memory 404 to processor 402.

It will also be appreciated that in one embodiment, computer system 400 is controlled by operating system software. For example, one embodiment of the present invention utilizes Microsoft Windows® as the operating system for computer system 400. In other embodiments, other operating systems that may also be used with computer system 400 include, but are not limited to, the Apple Macintosh operating system, the Linux operating system, the Microsoft Windows CE® operating system, the Unix operating system, the 3Com Palm operating system, or the like.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A method, comprising:

accessing a pre-boot driver at a computer system during operating system runtime of the computer system;

depositing the pre-boot driver in a repository available to firmware of the computer system;

finding the pre-boot driver at the repository by the firmware during a subsequent pre-boot phase of the computer system; and executing the pre-boot driver during the subsequent pre-boot phase.

2. The method of claim 1 wherein executing the pre-boot driver includes launching a pre-boot driver interpreter to execute the pre-boot driver.

3. The method of claim 1 wherein the repository comprises a non-volatile storage device.

4. The method of claim 1 wherein the repository comprises a memory device of the computer system.

5. The method of claim 1, further comprising setting a pointer to indicate to the firmware that the pre-boot driver is at the repository.

6. The method of claim 5 wherein the pointer comprises a data structure compatible with firmware that operates in accordance with an Extensible Firmware Interface (EFI) framework standard.

7. The method of claim 6 wherein the pointer comprises a variable compatible with firmware that operates in accordance with an Extensible Firmware Interface (EFI) framework standard.

8. The method of claim 1 wherein accessing the pre-boot driver comprises downloading the pre-boot driver from a network communicatively coupled to the computer system.

9. An article of manufacture comprising:

a machine-readable medium including a plurality of instructions which when executed perform operations comprising:

checking a pointer by firmware during a pre-boot phase of the computer system, the pointer having been updated by an operating system of the computer system;

finding a pre-boot driver indicated by the pointer at a repository available to the firmware and the operating system; and executing the pre-boot driver during the pre-boot phase.

10. The article of manufacture of claim 9 wherein the repository comprises a non-volatile storage device.

11. The article of manufacture of claim 9 wherein the pointer comprises a variable compatible with firmware that operates in accordance with an Extensible Firmware Interface (EFI) framework standard.

12. The article of manufacture of claim 9 wherein the pre-boot driver comprises Extensible Firmware Interface (EFI) Byte Code.

13. An article of manufacture comprising:

a machine-readable medium including a plurality of instructions which when executed perform operations comprising:

receiving a pre-boot driver at a computer system during operating system runtime of an operating system of the computer system;

depositing the pre-boot driver in a repository available to the operating system and firmware of the computer system; and setting a pointer to indicate to the firmware at a pre-boot phase of the computer system that the pre-boot driver is at the repository.

14. The article of manufacture of claim 13 wherein the repository comprises a non-volatile storage device.

15. The article of manufacture of claim 13 wherein the pointer comprises a variable compatible with firmware that operates in accordance with an Extensible Firmware Interface (EFI) framework standard.

16. The article of manufacture of claim 13 wherein the pre-boot driver comprises Extensible Firmware Interface (EFI) Byte Code.

17. A computer system, comprising:

a processor; and at least one storage device operatively coupled to the processor, the at least one storage device including instructions which when executed by the processor perform operations comprising:

receiving a pre-boot driver at a computer system during operating system runtime of an operating system of the computer system;

depositing the pre-boot driver in a repository available to the operating system and firmware of the computer system;

setting a pointer to indicate to the firmware that the pre-boot driver is at the repository;

resetting the computer system;

finding the pre-boot driver at the repository by the firmware during a pre-boot phase of the computer system using the pointer; and executing the pre-boot driver during the pre-boot phase.

18. The computer system of claim 17 wherein the at least one storage device comprises a flash device including firmware instructions and a hard disk including operating system instructions.

19. The computer system of claim 18 wherein the firmware instructions to operate in accordance with an Extensible Firmware Interface (EFI) framework standard.

20. The computer system of claim 17 wherein the pre-boot driver comprises Extensible Firmware Interface (EFI) Byte Code.

21. The computer system of claim 17 wherein the repository comprises a non-volatile storage device.

22. The computer system of claim 17 wherein the pointer comprises a variable compatible with firmware that operates in accordance with an Extensible Firmware Interface (EFI) framework standard.

23. A computer system, comprising:

a processor;

an input/output device operatively coupled to the processor;

a storage device operatively coupled to the processor to store a pre-boot driver associated with the input/output device, the pre-boot driver deposited in the storage device by an operating system of the computer system during operating system runtime; and a pre-boot driver interpreter executable by the processor to interpret the pre-boot driver during a pre-boot phase of the computer system to enable firmware of the computer system to access the input/output device.

24. The computer system of claim 23 wherein the pre-boot driver comprises Extensible Firmware Interface (EFI) Byte Code.

25. The computer system of claim 23, further comprising a pointer to point to the pre-boot driver stored on the storage device, the pointer accessible by the firmware during the pre-boot phase to enable the firmware to find the pre-boot driver.

26. The computer system of claim 23 wherein the pointer comprises an Extensible Firmware Interface (EFI) variable stored in a non-volatile storage device of the computer system.

* * * * *